Figure 1:
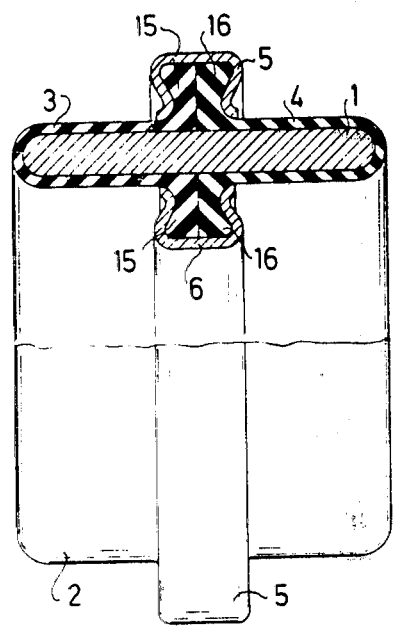

United States Patent [19]

Berg

[11] 4,260,168

[45] Apr. 7, 1981

[54] SEALING RING

[76] Inventor: Lennart G. Berg, Diagnosvägen 4B, 2 tr., S-14154 Huddinge, Sweden

[21] Appl. No.: 55,274

[22] Filed: Jul. 6, 1979

[51] Int. Cl.³ .............................................. F16J 15/12
[52] U.S. Cl. ................................. 277/225; 277/167.5; 285/334.2
[58] Field of Search ............... 277/152, 154, 165, 166, 277/167.5, 188 R, 197, 225, 237 R; 285/334.3, 55, 334.2

[56] References Cited

U.S. PATENT DOCUMENTS

| | | | |
|---|---|---|---|
| 1,626,962 | 5/1927 | Oven | 277/225 |
| 2,517,290 | 8/1950 | DeMoude et al. | 277/225 |
| 3,197,218 | 7/1965 | Coulter | 277/167.5 |
| 3,353,850 | 11/1967 | Butz et al. | 285/334.2 X |
| 3,554,581 | 1/1971 | Mason et al. | 277/225 X |

FOREIGN PATENT DOCUMENTS

| | | | |
|---|---|---|---|
| 745054 | 10/1966 | Canada | 285/334.2 |
| 366102 | 4/1974 | Sweden | 277/225 |
| 560515 | 4/1944 | United Kingdom | 277/225 |
| 566329 | 12/1944 | United Kingdom | 277/225 |
| 1258231 | 12/1971 | United Kingdom | 277/225 |
| 1449258 | 9/1976 | United Kingdom | 277/225 |

Primary Examiner—Robert S. Ward, Jr.
Attorney, Agent, or Firm—Ostrolenk, Faber, Gerb & Soffen

[57] ABSTRACT

A sealing ring has an annular, at least substantially stiff core and therearound an elastically sealing sheath which is glidable on the core. At least one annular part with an internal space adapted to the cross section of the core is attached around the core by means of mutually connected circumferential portions. The mutual connection of the sheath portions is provided by means of at least one annular fastening member, concentric with the core and made of a harder material than the sheath material. The fastening member is in mutual engagement with the sheath portions for keeping together and stiffening them.

12 Claims, 7 Drawing Figures

SEALING RING

The present invention relates to a sealing ring with an annular, at least substantially stiff core and a sheath of elastic sealing material surrounding the core, said sheath being glidable on the core and consisting of at least one annular part with internal space adapted to the cross section of the core, and fastened around the core by means of mutually connected circumferential portions.

Such sealing rings are known, inter alia, from the Swedish Patent Specification No. 366 102 and the British Patent Specification No. 1 449 258. In the known rings, the at least substantially stiff core, constituting support members in the rings, consists of an annular, comparatively thin steel strip which has smooth side surfaces and carefully rounded edges, as well as relatively large extension axially. The elastic sheath, e.g. consisting of rubber, is placed about this core either by molding thereon, or by placing two U-shaped sheath parts on the core from either end and attaching these to each other by vulcanizing the adjacent circumferential portions. So that the sheath will slide easily round the core, a suitable lubricant, e.g. silicon grease, can be provided between the sheath and the core. The sheath can possibly be provided with two radially projecting beads which, in a central position of the sealing ring, lie in the same radial plane, one on the outside and one on the inside of the ring. These beads are intended to be squeezed in grooves or the like in the outer and inner cylindrical sealing surfaces, the sealing ring being intended to be used between both said surfaces and against which the ring is active during the mutual relative movements of said surfaces.

When placing the elastic sheath round the core it has so far been difficult to obtain a correct position of the core in the sheath, simultaneously as it has been difficult to obtain the uniform and correct sheath thickness round the core. This has been the case, irrespective of whether the sheath has been placed round the core by means of molding or by previously prepared sheath parts or sections having been placed round the core and subsequently vulcanized to each other. The most pertinent reason for this appears to have been that the sheath material gets into a phase between a solid and a plastic condition in both cases, as a result of the heat supply, making the fixation of the sheath in relation to the core more difficult, with the drawbacks given here as a result.

The object of the invention is to remove these drawbacks and provide a new and improved sealing ring of the kind disclosed in the introduction. A sealing ring made in accordance with the invention for this purpose, in which both the correct position of the core in relation to the sheath material and the correct sheath thickness about the ring can be achieved without difficulty, is primarily characterized in that the mutual connection of the circumferential portions of the sheath is provided by means of at least one annular fastening member concentric with the core and made of a harder material than the sheath material, said member being in complementary engagement with said sheath portions and as a result thereof keeps together and stiffens these portions.

Since there is at least one fastening member which, in accordance with the invention, connects the circumferential portions of the sheath part or parts with each other, the application of heat required in mounting the sheath on the previously known sealing ring cores is entirely avoided. The use of mechanical fastening members in accordance with the invention furthermore facilitates and cheapens the whole production of sealing rings, since the sheath portions can now be molded individually in series, and thereafter be simply and quickly placed on the associated cores and fixed thereto with simple aids. The application of a possible lubricant between the sheath and the core has further been simplified. The lubricant can now be easily applied at an optional occasion before finally fitting the mechanical fastening members to the sealing rings.

Moreover, the further advantage has been gained that the annular fastening member which, in accordance with the invention, connects the circumferential portions of the sheath part or parts to each other can be formed in many different ways. For example, this enables the member to be used for attaching the sealing ring at the point of use, whereby the need of special guide means for fixing the ring and/or urging it can be dispensed with. The annular fastening member can namely be situated either on the outside of the sheath or also in its interior.

When the annular fastening member in accordance with the invention is situated outside the sheath, it is so formed that it grips round circumferential portions of the sheath, having the form of flanges or beads projecting from it. A U-shaped profile has been found particularly suitable for the annular fastening member in such a case. The member can then also be surrounded by the sealng ring and comprise two washers, which are kept together axially by means of at least one rivet and which have a central through-hole which can constitute an anchorage for an operating means for the ring.

On the other hand, when the annular fastening member in accordance with the invention is situated in the interior of the sealing ring sheath, it is suitably placed in complementary recesses in surfaces on the circumferential portions of the sleeve, said surfaces facing towards each other when the circumferential portions are connected to each other by means of the annular fastening member. When the annular fastening member in accordance with the invention is situated in this way, it can also be formed in several different manners. For example, it can be in engagement with at least one further annular fastening member, which is attached to either of the circumferential portions of the sheath intended for mutual connection, and which has a U-shaped profile for engagement with the first-mentioned fastening member.

In another embodiment which has been found particularly advantageous in a sealing ring where the annular fastening member is situated inside the ring sheath consisting of sealing material, the fastening member consists of two annular halves, each in engagement with and glued or vulcanized to its associated circumferential portion of the sheath and the halves are mutually adhered to each other.

When the annular fastening member is situated inside the sheath ring it can, to advantage, also be formed so that it has axially projecting portions on either side to obtain a form-enveloped engagement with the circumferential portions of the sheath.

Irrespective of whether the annular fastening member in accordance with the invention is placed outside or inside the sealing ring sheath, it can be situated on the outside of the ring as well as on its inside.

In such applications where the mass of the sealing ring is of importance, the weight of the ring core can be reduced, since the mass forces of the core cause stresses in the sheath for reciprocating movements of the sealing ring. The core can suitably be made hollow for this purpose and be made from comparatively thin sheet material.

Since sealing rings of the kind in question are intended to have long life and the sheath material, which preferably consists of rubber, becomes less elastic after a long time in warm water, for example, it is of importance that a sealing in accordance with the invention can be mounted with pretension in the bore, or the like, where it is to be used. For this purpose, a sealing ring made in accordance with the invention suitably has a core which is radially resilient so that it is capable of solidly pressing the sheath material against the surface with which it is to cooperate sealingly for a long time.

In an especially suitable embodiment of the sealing ring in accordance with the invention, the ring core is made hollow to be radially resilient, made from a comparatively thin sheet material, and provided with a cambered outside.

The invention will now be described in detail with the aid of some embodiments of sealing rings made in accordance therewith and illustrated in radial sections on the attached drawings.

Figure 2:
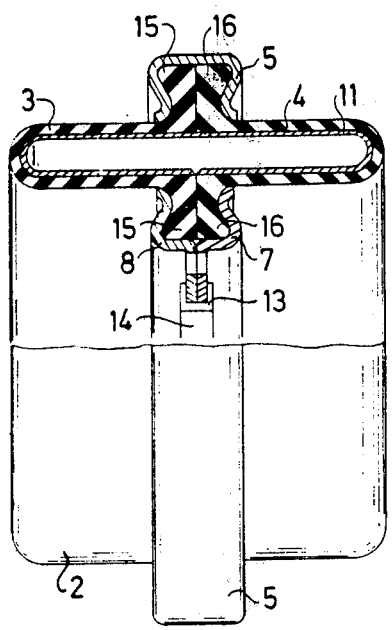
Figure 3:
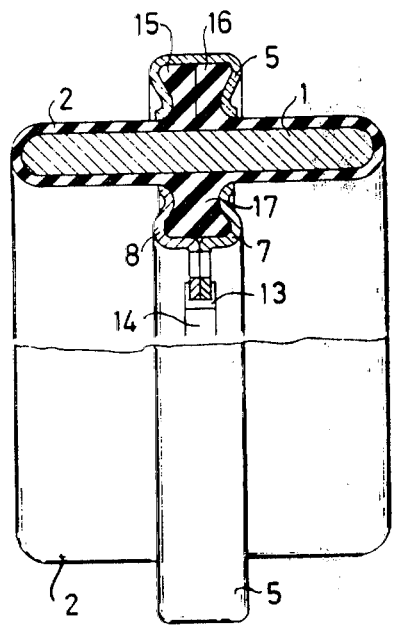
Figure 4:
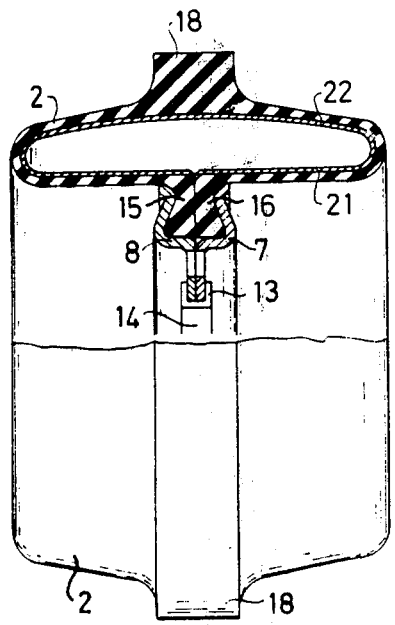

FIGS. 1 and 2 show two different embodiments of a sealing ring in accordance with the invention, the annular core of which is surrounded by two sheath parts mutually connected by means of two annular fastening members situated outside the rings, while FIGS. 3 and 4 show two further embodiments in which the cores are surrounded by a single sheath part, retained on the ring core at its outer and inner circumference by means of an annular, mechanical fastening member situated outside the sheath.

Figure 5:
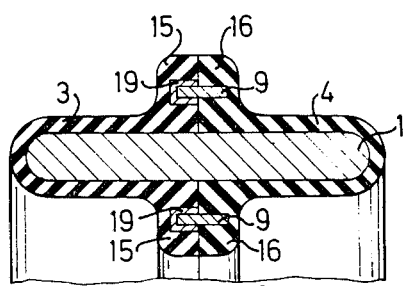
Figure 6:
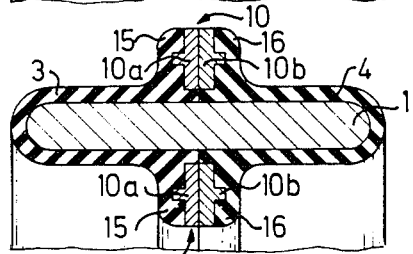
Figure 7:
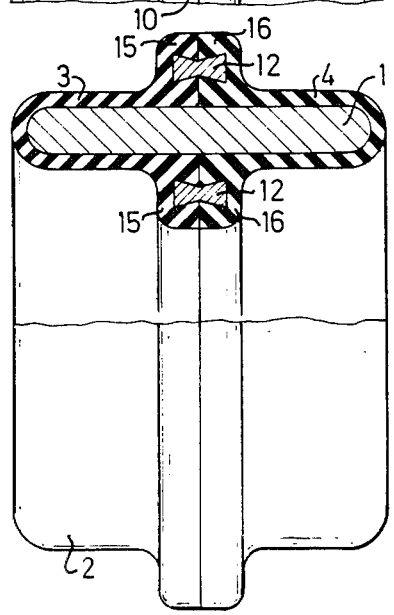

FIGS. 5-7 finally show three further embodiments of rings where two sheath parts are connected to each other with the aid of annular fastening members of different embodiments but which are situated on the interior of the ring sheaths.

As is apparent from the drawings, a sealing ring in accordance with the invention has an annular and at least substantially stiff core 1,11,21. This can either be massive, as is the case for the embodiments illustrated in FIGS. 1, 3, 5, 6 and 7, where it consists of an annular, comparatively thin steel strip; or it can also be hollow, as is the case for the two embodiments illustrated in FIGS. 2 and 4, where the core consists of thin sheet material which has been bent to form a cross section with a practically rectangular appearance and with completely rounded-off corners. In all the illustrated cases, the core has a relatively large axial extension, however. It further has smooth side surfaces and carefully rounded-off edges so that a sheath 2 surrounding the core and made of an elastic sealing material, e.g. rubber which can be reinforced with fabric, is glidable thereon. In the embodiment illustrated in FIG. 4, the hollow core 21 is also provided with a cambered outmost side 22 which makes the core, and thereby the entire sealing ring, resilient radially so that it can be mounted with a given pretension in the bore or a similar space in which it is to be used.

The sheath 2, surrounding the core 1,11,21 in a sealing ring in accordance with the invention, has an internal space adapted to the cross section of the core, and with suitable pretension is attached to the core by means of mutually connected circumferential portions.

In the embodiments of the sealing ring illustrated in FIGS. 1, 2 and 5-7, the sheath consists of two sheath parts 3,4 having U-shaped profiles, the projecting shank ends of which are connected to each other so that the two U-profiles enclose the core 1,11 therebetween. On the other hand, in the embodiments illustrated in FIGS. 3 and 4, the sheath 2 consists of a single part, by itself surrounding the core 1,21.

The two sheath parts 3,4 with their U-profile as well as the sheath 2 made in one piece are suitably produced by molding, and without the aid of the annular cores which are to be incorporated in the finished sealing rings. Molding the sheath parts 3,4 provided with a U-profile can even take place with automatic removal of the mold cores, while the mold cores must be removed manually when molding the integrally made sheath 2, as is apparent from FIGS. 3 and 4.

In accordance with the invention, the mutual connection of the circumferential portions of the sheath 2 is provided by at least one annular mechanical fastening member, 5; 6; 7, 8; 9; 10; 12, concentric with the core 1, 11, 21, said member being in engagement with these sheath portions and keeping them together as a result thereof.

In the embodiment of the sealing ring in accordance with the invention shown in FIG. 1, the outer as well as the inner circumferential portions of the two sheath parts, provided with U-profiles, are mutually connected with the aid of two such mechanical fastening members 5,6 having a U-shaped profile and gripping round the circumferential portions on the sheath parts 3,4, said portions being formed as flanges or beads 15,16 radially projecting from the sheath. One of these fastening members is placed round the sheath beads situated on the outside of the sealing ring, while the other one 6 is placed round the sheath beads situated on the inside of the ring.

In the embodiments illustrated in FIGS. 2, 3 and 4, the mechanical annular fastening member in accordance with the invention, situated on the inside of the sealing ring, has another form and comprises two washers 7,8 which are axially kept together by means of at least one rivet 13, in this case suitably consisting of a tubular rivet with a central through-hole 14, which can possibly constitute anchorage for an operating means for providing the movements of the sealing ring. In the embodiments illustrated in FIGS. 2 and 4, the two washers 7,8 grip from either side round the flanges or beads 15,16 projecting radially from the sheath towards the center of the sealing ring, while the two riveted washers 7,8 in the embodiment illustrated in FIG. 3 grip round a single sheath bead 17 on the inside of the ring. The inside mechanical fastening member of the embodiment illustrated in FIG. 3 thus does not have the task of mutually connecting any circumferential portions of the sheath 2, but instead has the task of forming an anchorage for an operating means.

In the embodiment illustrated in FIG. 4, the sealing ring sheath 2 has an exterior, radially projecting flange or bead 18 which is not intended for connecting any circumferential portions of the sheath but is instead intended for fixing the ring in a bore or the like. On the other hand, in the embodiments illustrated in FIGS. 1-3, it is the fastening member 5 on the outside of the rings which, apart from it mutually connecting the circumferential portions of the sheath 2, also has the task of serving as a means for attaching the rings at their place of use.

In the three embodiments illustrated in FIGS. 5–7, the annular fastening members 9,10,12, two in number, are situated in the interior of the ring sheaths 2, the circumferential portions or beads 15,16 of which are provided for this purpose with correspondingly formed recesses in the surfaces thereof facing towards each other when the circumferential portions in question are mutually connected by means of the fastening members.

In the embodiment of the sealing ring in accordance with the invention illustrated in FIG. 5, each of the two annular fastening members 9 are furthermore in engagement with at least one further, annular fastening member 19, which is attached to either of the circumferential portions 15,16 of the sheath 2, intended for mutual connection, and has a U-shaped profile for engagement with the first-mentioned fastening member 9. The further fastening member 19 is suitably vulcanized to a correspondingly formed groove in the circumferential portion of the sheath, while the engagement between the two coacting, annular fastening members 9,19 can be of the press fit type, or reinforced by means of gluing.

In the embodiment illustrated in FIG. 6, each of the two annular fastening members 10, connecting the circumferential portions or beads 15,16 of the ring sheath 2 to each other, consists of two annular halves 10a, 10b, each in engagement with and vulcanized or cemented to its associated circumferential portion or bead on the sheath 2 and are mutually glued to each other.

In the embodiment illustrated in FIG. 7, finally, each of the two annular fastening members 12 have portions which project axially on either side with gradually increasing thickness for obtaining form-enveloped engagement with complementary recesses in the circumferential portions or beads 15,16 of the sheath 2. The engagement thus provided can possibly be reinforced by gluing.

The illustrated annular fastening members are all made from material which is harder than the sealing material in the sheath 2. Suitable types of material are, for example, and dependent on the form of the fastening member, different kinds of metals, plastics and hard rubber.

The invention is not restricted to the embodiment examples described here and shown on the drawing, but can be modified in a variety of ways within the scope of the patent claims.

What I claim is:

1. A sealing ring with an annular, at least substantially stiff core and a sheath of elastic sealing material surrounding it, the sheath being glidable on the core, whereby the sheath might roll about the core, the sheath being comprised of at least one annular part with an internal space adapted to the cross section of the core, the sheath being discontinuous circumferentially around the core along an annular pathway spaced in from the sides of the ring, the sheath having circumferential portions which meet along the path where the sheath is discontinuous, the sheath being attached around the core by means of a mutual connection at the circumferential portions, the mutual connection of the circumferential portions of the sheath being provided by at least one annular fastening member which is concentric with the core and is made of a harder material than the sheath material, the fastening member being in mutual engagement with the circumferential portions for keeping them together and for stiffening them.

2. A sealing ring as claimed in claim 1, wherein the annular fastening member is situated on the outside of the sheath and grips around the circumferential portions of the sheath, the circumferential portions having the form of flanges projecting radially from the sheath.

3. A sealing ring as claimed in claim 1 or 2, wherein the annular fastening member has a U-shaped profile.

4. A sealing ring as claimed in claim 1 or 2, wherein the annular fastening member is positioned on the inside of the sealing ring where it is surrounded by the sealing ring and the fastening member further comprises two washers which are axially kept together by means of at least one rivet and which have a central through-hole constituting anchorage for an operating means.

5. A sealing ring as claimed in claim 1, wherein the circumferential portions of the sheath have facing surfaces with facing recesses defined in them, the annular fastening member is situated in the interior of the sheath and is fitted in the complementary recesses in the surfaces of the circumferential portions of the sheath, the surfaces facing toward each other when the circumferential portions are connected to each other by the fastening member.

6. A sealing ring as claimed in claim 1 or 5, wherein the annular fastening member is comprised of two parts in engagement, one part is attached to one of the circumferential portions of the sheath intended for mutual connection, and the one part has a U-shaped profile for engagement with the other part; and the other part being attached to the other circumferential portion and being received in the opening of the U-shaped profile of the one part.

7. A sealing ring as claimed in claim 1 or 5, wherein the annular fastening member is comprised of two annular halves, each in engagement with and affixed to a respective associated one of the circumferential portions of the sheath and the annular halves are mutually glued to each other.

8. A sealing ring as claimed in claim 1 or 5, wherein the annular fastening member has axially projecting portions extending in either direction for obtaining form-enveloped engagement with complementarily formed recesses in the circumferential portions of the sheath and the sheath has the formed recesses in the circumferential portions thereof for engaging the fastening member.

9. A sealing ring as claimed in claim 1, wherein the core is hollow and is comprised of a comparatively thin sheet material.

10. A sealing ring as claimed in claim 1, wherein the core is resilient in a radial direction.

11. A sealing ring as claimed in claim 1, wherein the core has a cambered outer side.

12. A sealing ring as claimed in claim 3, wherein the annular fastening member is positioned on the inside of the sealing ring where it is surrounded by the sealing ring and the fastening member further comprises two washers which are axially kept together by means of at least one rivet and which have a central through-hole constituting anchorage for an operating means.

* * * * *